(No Model.)

J. G. TRUMAN.
ELECTRIC MOTOR.

No. 606,605.　　　　　Patented June 28, 1898.

Witnesses:
L. S. Elliott
Alx. Scott

Inventor:
John G. Truman,
By Eugene M. Johnson,
his attorney.

UNITED STATES PATENT OFFICE.

JONATHAN G. TRUMAN, OF LEMON CITY, FLORIDA.

ELECTRIC MOTOR.

SPECIFICATION forming part of Letters Patent No. 606,605, dated June 28, 1898.

Application filed January 10, 1894. Serial No. 496,394. (No model.)

*To all whom it may concern:*

Be it known that I, JONATHAN G. TRUMAN, a citizen of the United States, and a resident of Lemon City, in the county of Dade and State of Florida, have invented certain new and useful Improvements in Electric Motors; and I do hereby declare the following to be a full, clear, and exact description of the invention, such as will enable others skilled in the art to which it appertains to make and use the same.

This invention relates to improvements in electric motors.

The object of my invention is to provide a simple and effective magnetic engine which is composed of but few parts, the same being organized so that an armature will be actuated by the alternate energizing and deënergizing of electromagnets, the armature being connected to the magnets by links or plates which are movably connected together to form connecting means between the electromagnets and the armature, so that when the electromagnets are energized the links will assist in drawing the armature toward the same.

Figure 1:
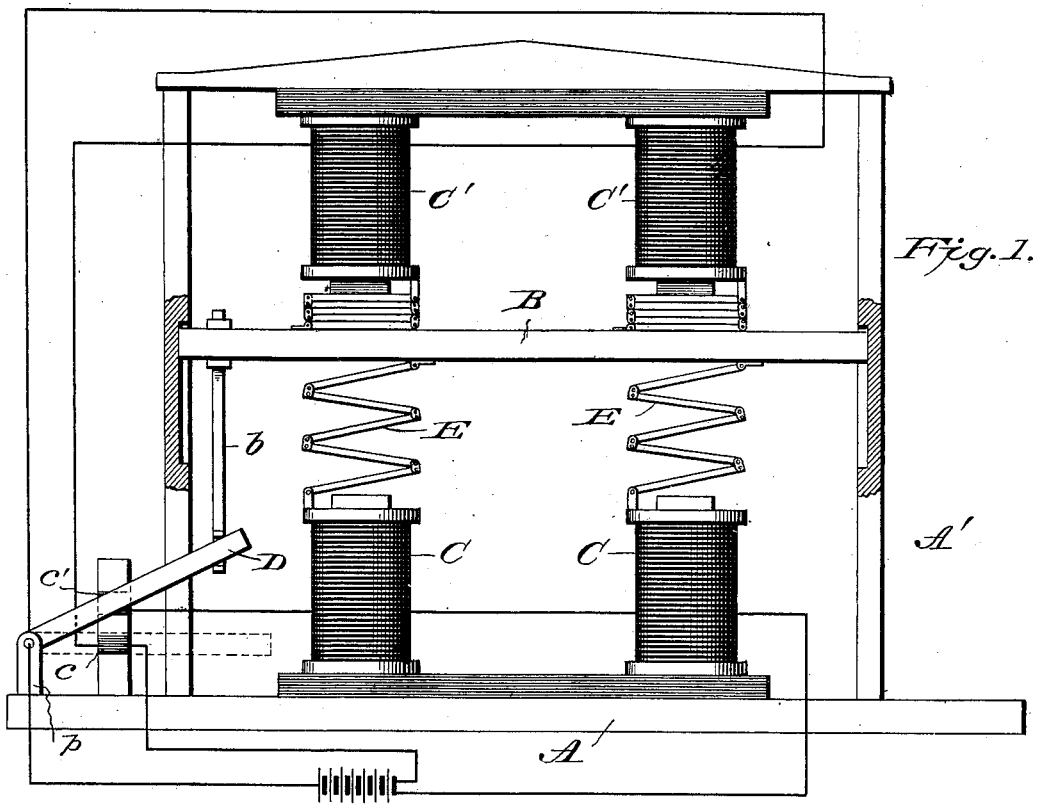
Figure 2:
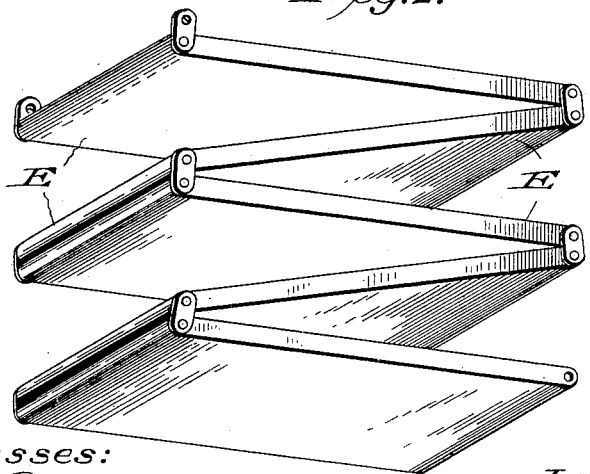

In the accompanying drawings, Figure 1 is a side elevation illustrating one form of an electromagnet, engine, or motor embodying my improvement. Fig. 2 is a detail view of the links or connecting-plates.

A refers to a suitable base having a frame A' with an upper cross-piece parallel with the base and vertical side pieces which are preferably grooved or otherwise provided with guides which engage the armature B, the same being free to move between electromagnets C C', positioned above and below said armature. The magnets are of the usual type, and the wires extend from the helixes of one set of electromagnets to a battery or other suitable generator, while the corresponding wire of the other magnets engage with the binding-post $p$, which is also connected to the battery. The other wires from the magnets are connected to contact-points $c\ c'$. The armature B, which in its simplest form consists of a bar of soft iron, is positioned between the electromagnets and carries a bar $b$, which is adapted to engage with an arm or switch D, which is pivoted to the post $p$, so as to be electrically connected thereto, said switch when moved engaging with the contact-points $c\ c'$, the wires from the magnets being also attached thereto. When the armature is raised by the energizing of the electromagnet C', the swinging end of the switch then engages the contact-point $c'$, which completes the circuit. The upward movement of the armature, which carries with it the arm $b$, raises the switch, breaks the circuit between the battery and the electromagnets C', and makes a circuit between the battery and electromagnets C, which draws the armature down, thus vibrating the armature, which movement can be utilized by connecting the armature with any suitable means for mechanically using the motion so produced. Any suitable style of circuit-breaking may be used.

The combination of the sets of electromagnets and intermediate armature for both sets, the switch, and electric generator provides a motor in which the magnets would have to be placed near each other, and in order to provide a greater movement of the armature and position the magnets at a considerable distance from each other and utilize the residual magnetism incident to the intermittent energizing of the magnets I attach to each of the magnets a series of alternately-connected bars or plates E, which are pivotally connected to each other and to the armature as well as to the electromagnets, one set of alternately-connected plates being provided for each electromagnet. By use of the series of connected plates I am enabled to position the magnets at a greater distance apart from each other, thereby securing a greater range of movement of the armature and an increase of power. It will also be noted that the plates E are attracted toward each other, so that when the electromagnets are energized the plates will be drawn toward each other, the force increasing as the armature moves toward the energized magnets, as the plates then approach nearer parallel planes.

The invention hereinbefore described is susceptible of various modifications, and it is obvious that the armature instead of being mounted so as to have an intermittent reciprocating motion imparted thereto may be supported so as to oscillate, which movement can be converted into a rotary motion.

I have not deemed it necessary to illustrate means for utilizing the motion imparted to the armature, as it can be accomplished in any suitable manner and forms no essential part of my invention.

What I claim as new is—

1. In a motor the combination with a movable armature of a series of connecting bars or plates attached thereto and electromagnets with which the plates are also connected, substantially as set forth.

2. In a motor the combination of an armature, a series of connected plates attached to the opposite sides of the armature, magnets to which the plates are attached and means for alternately energizing the magnets substantially as set forth.

3. In an electric magnetic motor the combination with vibratory armature, electromagnets positioned on opposite sides of the same a series of plates, the plates of each series being alternately connected the opposite end plates being attached to the armature and to the magnets, a switch operated by the vibratory armature to alternately make and break circuits and an electric generator or battery, substantially as shown and for the purpose set forth.

In testimony whereof I have signed this specification in the presence of two subscribing witnesses.

J. G. TRUMAN.

Witnesses:
 E. C. HARRINGTON,
 CHAS. L. TYLER.